(12) United States Patent
Chiaretti

(10) Patent No.: US 6,804,424 B2
(45) Date of Patent: Oct. 12, 2004

(54) OPTICAL DEVICE, IN PARTICULAR OPTICAL SWITCHING DEVICE WITH IMPROVED STABILITY OF THE BUBBLES AND REDUCED INSERTION LOSSES

(75) Inventor: Guido Chiaretti, Novate Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 81 days.

(21) Appl. No.: 10/170,020

(22) Filed: Jun. 12, 2002

(65) Prior Publication Data

US 2003/0026522 A1 Feb. 6, 2003

(51) Int. Cl.[7] .............................. G02B 6/12; G02B 6/34
(52) U.S. Cl. ............................. 385/14; 385/15; 385/16; 385/39
(58) Field of Search ................................ 385/14–16, 19, 385/39, 40, 88, 89

(56) References Cited

U.S. PATENT DOCUMENTS

| | | | |
|---|---|---|---|
| 4,589,730 A | 5/1986 | Obu | 350/267 |
| 4,988,157 A | 1/1991 | Jackel et al. | 350/96.13 |
| 6,188,815 B1 * | 2/2001 | Schiaffino et al. | 385/16 |
| 6,532,319 B2 * | 3/2003 | Myer et al. | 385/17 |
| 2003/0202730 A1 * | 10/2003 | Fujieda et al. | 385/14 |

FOREIGN PATENT DOCUMENTS

| | | |
|---|---|---|
| EP | 0 813 088 A1 | 12/1997 |
| EP | 1 014 140 A2 | 6/2000 |

* cited by examiner

Primary Examiner—Hemang Sanghavi
(74) Attorney, Agent, or Firm—Lisa K. Jorgenson; Robert Iannucci; Seed IP Law Group PLLC

(57) ABSTRACT

An optical device is formed by a first chip and a second chip bonded together. The first chip (4 has an optical layer of glass housing an optical circuit; the second chip has a body of semiconductor material housing integrated electronic components and coated with a bonding layer of glass fixed directly and contiguous to the optical layer of the first chip. The bonding layer delimits cavities facing corresponding cavities in the first chip in positions corresponding to the intersection points of waveguides constituting the optical circuit. The cavities are filled with a liquid having the same refractive index as the waveguides. Underneath each cavity, in the body of semiconductor material there is present a resistor, which, when traversed by current, causes formation of a bubble inside the chamber and deflection of the light beam traversing a waveguide towards a different waveguide.

23 Claims, 3 Drawing Sheets

OPTICAL DEVICE, IN PARTICULAR OPTICAL SWITCHING DEVICE WITH IMPROVED STABILITY OF THE BUBBLES AND REDUCED INSERTION LOSSES

BACKGROUND OF THE INVENTION

1. Field of the Invention

The present invention relates to an optical device, in particular an optical switching device.

2. Description of the Related Art

As is known, switching devices are essential elements for telecommunications and have the purpose of appropriately routing the light beams transmitted along waveguides.

At present, both opto-mechanical and thermo-optical switching devices are available. Opto-mechanical switching devices have good insertion loss and crosstalk characteristics, but are not reliable on account of the presence of moving parts. Thermo-optical switching devices do not have problems of reliability linked to moving parts, but have poorer characteristics in terms of crosstalk and enable implementation of only a small number of waveguides (eight or sixteen).

In order to overcome the above limitations, different solutions are being studied that are based on semiconductor technology, in which waveguides, formed in a silicon substrate, comprise micromirrors formed at the switching points. Also undergoing study are solutions in which the waveguides are formed in a glass plate bonded to a silicon substrate (the latter technology being generally referred to as "Planar Lightwave Circuit Technology on Silicon Substrate").

Aspects of the present invention regard a switching device of the latter type, including a glass plate having a plurality of input/output openings between which waveguides that intersect one another extend (switching matrix). In the crossover points, the waveguides have cavities filled with a liquid having the same refractive index as the waveguide.

The light beams that traverse the waveguides are thus not deviated by the liquid present in the crossover points and exit the switching device in the original direction with a given insertion loss caused by the cavities.

Underneath each cavity, inside the substrate on which the glass plate is bonded there is present a resistor, which, when traversed by current, generates heat by the Joule effect and causes a change of state of the liquid present in the cavity. In practice, activation of the resistors brings about formation of bubbles in the crossover points. Given that the bubbles have a refractive index different from that of the original waveguide, the light beam that passes through a crossover point in which an air bubble is present is deviated with respect to the original direction, towards a different waveguide.

Switching of the light beam is associated to a given crosstalk (for example, in the region of 50 dB) and to pre-set insertion losses (for example, of between 3 and 7 dB, according to the specific path of the light beam within the switching matrix). In order to reduce the optical budget in the switching matrix and increase the number of input/output openings, it is therefore necessary to reduce the insertion losses.

In particular, the insertion losses are linked to the geometry of the cavities in which the bubbles form and, specifically, are correlated to the size of the cavities themselves, as explained in what follows.

In this connection, reference may be made to FIG. 1 illustrating a top view of a portion of an optical switching device 1 of the type considered, including two waveguides 2a, 2b, which are perpendicular to one another and intersect at a chamber 3, inside which there is present a liquid having, in normal conditions, optical properties similar to those of the waveguides 2a, 2b.

As may be better seen in the cross section of FIG. 2, the optical switching device 1 is formed by an optical switching chip 4, a switching control chip 5, and a reservoir chip 6, which are bonded together in such a way as to form a sandwich.

The optical switching chip 4, defining a planar lightwave circuit (PLC), comprises a substrate 20 of semiconductor material (silicon) and an optical layer 21, made of glass (quartz), which houses the waveguides 2a, 2b and is deposited on top of the substrate 20. The waveguides 2a, 2b are preferably formed by (in a known way, which is not illustrated) a core of glass doped in such a way as to have a first refractive index, surrounded by a cladding doped in such a way as to have a second refractive index, so as to optimize transmission of the light beam and enable transmission of secondary wave modes or eliminate them according to the requisites imposed.

FIG. 2 illustrates a single waveguide 2a and a single chamber 3, which is formed by a first cavity 8 and a second cavity 12 facing one another. The first cavity 8 is formed in the optical layer 21 and faces a bottom surface 4a of the optical switching chip 4. The optical-switching chip 4 is fixed, on its bottom surface 4a, to a top surface 5a of the switching control chip 5 by means of a hermetic O-ring 9, which delimits, together with the optical switching chip 4 and the switching control chip 5, a gap 10.

The second cavity 12 is formed in the switching control chip 5 and faces the top surface 5a of the latter. Beneath the second cavity 12 there is formed a resistor 11 connected to electronic control components (not illustrated and integrated into the switching control chip 5) which control passage of electric current through the resistor 11 according to the switching scheme desired. A through channel 13 extends inside the switching control chip 5 from the gap 10 as far as a bottom surface 5b of the switching control chip 5. The switching control chip 5 is fixed, on its bottom surface 5b, to the reservoir chip 6, by means of a hermetic bonding layer 15.

The reservoir chip 6, which is preferably also made of silicon and which houses a reservoir 16 facing the bottom surface 5b of the switching control chip 5, is here connected to the through channel 13 and terminates laterally for connection with a filling tube 17 on which a device 18 for controlling the pressure is arranged.

The filling tube 17, the reservoir 16, the through channel 13, the second cavity 12, the gap 10, and the cavity 8 are filled with a liquid having a refractive index equal to that of the waveguides 2a, 2b. In FIG. 2, a bubble 19 is moreover present in the chamber 3.

Given that the optical layer 21 is made of quartz and the switching control chip 5 is made of silicon, soldering thereof is critical, and stresses may occur in the structures such as to cause bowing of the optical switching device 1.

In addition, the O-ring 9 has a thickness of a few micron, which determines the height of the gap 10 and increases the distance between the resistor 11 and the first cavity 8. The presence of the gap 10 is disadvantageous and can cause problems of stability of the bubble 19 over time or a reduction in the transmission characteristics of the switching circuit, depending on the geometry of the chamber 3.

In particular, if the cavities 8, 12 are very wide, in such a way as to contain the bubble 19 completely in the lateral direction without the bubble extending longitudinally inside the gap 10 (as shown in FIG. 3), there is a high stability of the bubble. However, in this case the geometry of the bubble 19 causes high propagation losses, and the optical circuit has, as a whole, relatively high insertion losses.

If, instead, the size of the cavity 8 is small, such that the bubble 19 is not contained completely in the lateral direction and extends in width also inside the gap 10 (as shown in FIG. 4), there is a reduction in the propagation losses of the optical circuit, but the bubble becomes unstable over time, and its conformation depends upon the thermal conditions existing in the area surrounding the chamber 3.

In order to improve the stability of the bubbles, the ideal solution would be to concentrate as much as possible the distribution of the heat generated by the resistor 11 in such a way as to have a restricted heat spot, only inside the chamber 3, maintaining the size of the chamber 3 as small as possible in order to reduce the total insertion loss of the matrix. At present, however, this is not possible in so far as the presence of liquid in the gap 10 causes heating of a much wider area, even when the resistor 11 extends only underneath the second cavity 12.

Embodiments of the present invention provide an optical device that overcomes the drawbacks of the known solutions.

BRIEF SUMMARY OF THE INVENTION

Aspects of the present invention involve an optical device having a first chip including an optical layer of dielectric material housing an optical circuit. Further aspects involve a second chip including a body of semiconductor material housing integrated electronic components and bonded to said first chip. In accordance with other aspects of the invention, the first chip and the second chip respectively have a first cavity and a second cavity facing one another to form a chamber filled with a liquid. The second chip includes a lateral delimiting region, made of rigid material, arranged between said body of semiconductor material and said first chip and delimiting laterally said chamber.

BRIEF DESCRIPTION OF THE SEVERAL VIEWS OF THE DRAWING(S)

For a better understanding of the present invention, an exemplary embodiment thereof is now described, purely by way of non-limiting example, with reference to the attached drawings, in which.

DETAILED DESCRIPTION OF THE INVENTION

Embodiments of the invention will now be described, by way of example only, by referring to the annexed drawings, wherein: an optical device and a manufacturing method thereof are provided. In practice, according to embodiments of the invention, the space between the optical switching chip and the switching control chip is filled with rigid material, which surrounds the chamber at the crossover points, thus delimiting laterally the space in which the bubble may expand. Advantageously, the rigid filling material is formed by a bonding layer between the two chips, and the said layer is made of the same material (glass) as the optical switching chip, with a consequent reduction of any problems of stress and bowing. The bottom cavity and the liquid feed channels can be formed in the bonding layer.

Figure 1:
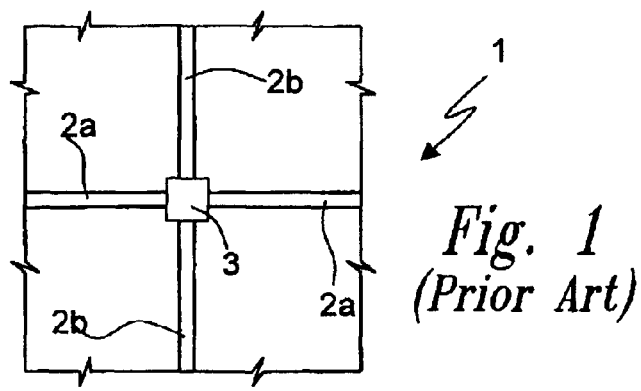
FIG. 1 is a top plan view of a portion of a known switching device.
Figure 2:
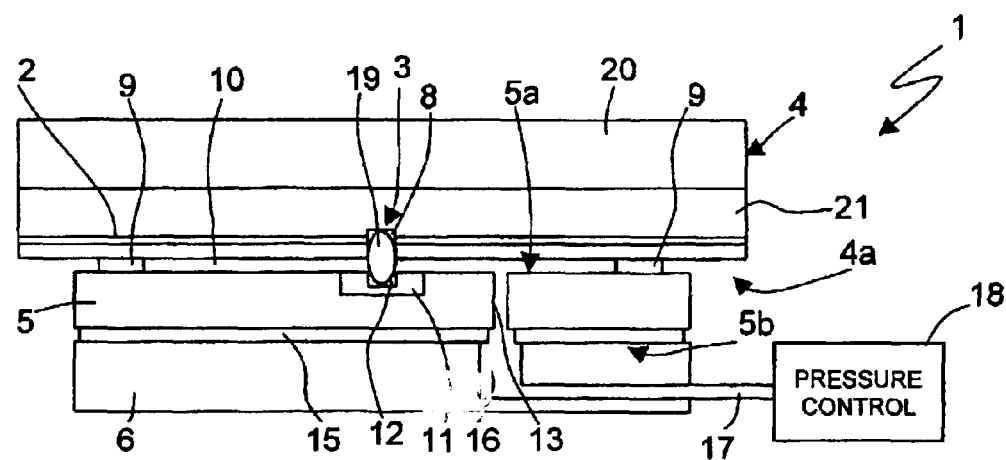
FIG. 2 is a cross-sectional view of the switching device of FIG. 1.
Figure 3:
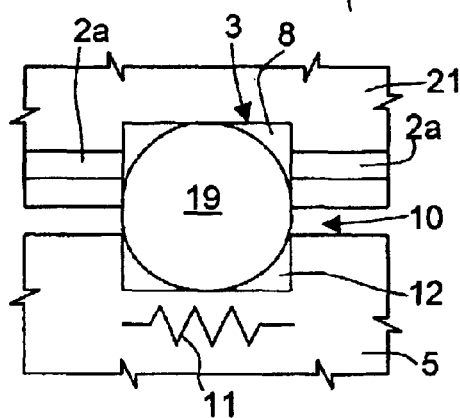
FIG. 3 shows a detail, at an enlarged scale, of the switching device of FIG. 2 in a first operating condition.
Figure 4:
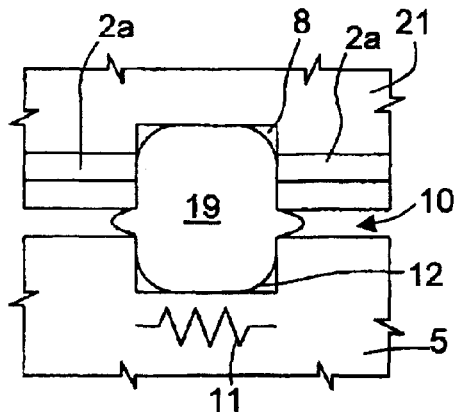
FIG. 4 shows a detail, at an enlarged scale, of the switching device of FIG. 2 in a second operating condition.
Figure 5:
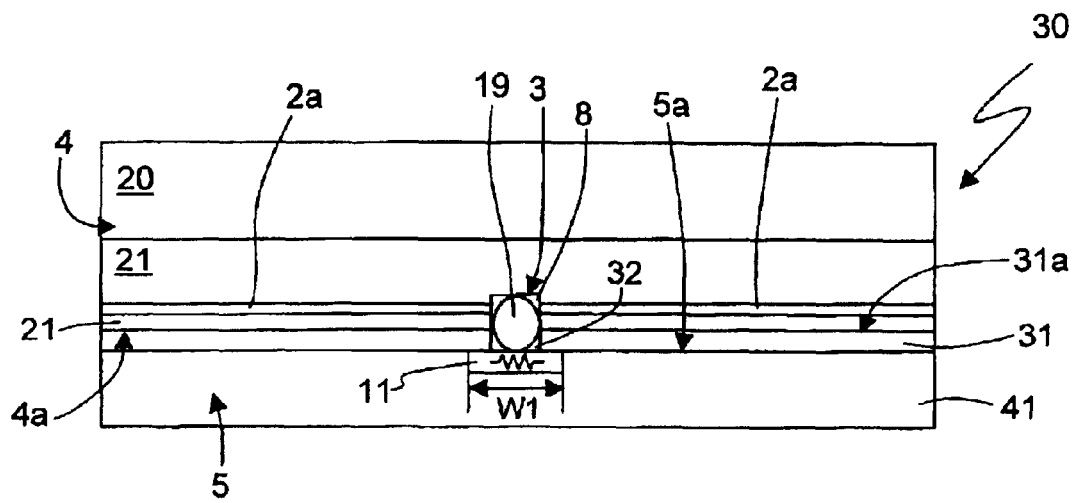
FIG. 5 is a cross-sectional view of a switching device according to an exemplary embodiment of the present invention.
Figure 6:
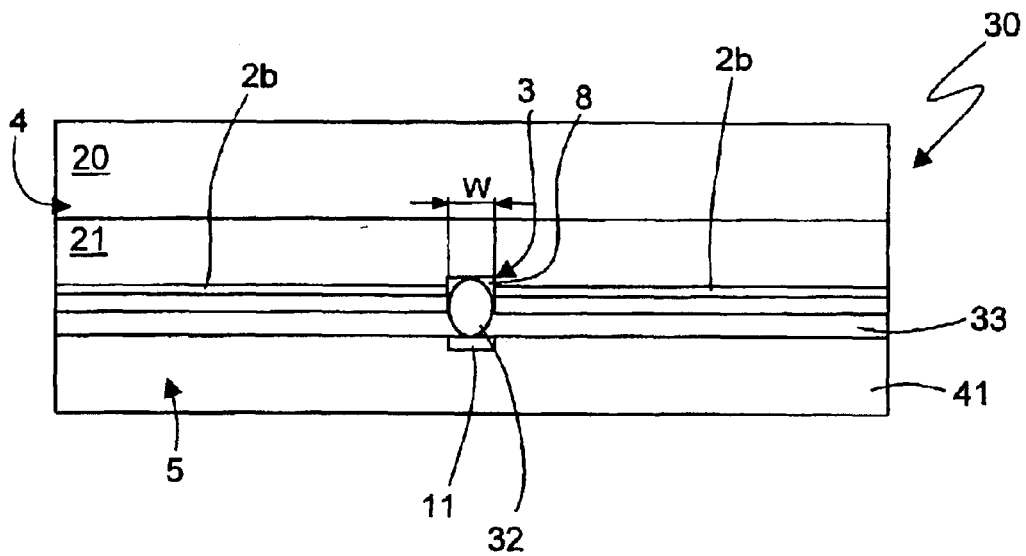
FIG. 6 is a cross-sectional view according to a plane perpendicular to that of the cross section of FIG. 5.

FIGS. 5 and 6 show an optical switching device 30 comprising an optical switching chip 4 and a switching control chip 5. The reservoir chip 6, instead, is not illustrated.

In the same way as in the known optical switching device, the optical switching chip 4 is formed by a substrate 20 of semiconductor material and by an optical layer 21, inside which a planar lightwave circuit is arranged formed by waveguides 2a (FIG. 5) and 2b (FIG. 6) and first cavities 8.

The switching control chip 5 is formed by a substrate 41 of semiconductor material (silicon) housing a resistor 11 and coated with a bonding layer 31, made of glass, having a surface 31a bonded to the bottom surface 4a of the optical switching chip 4. The bonding layer 31 has a second cavity 32 overlying a resistor 11 and facing the first cavity 8, in such a way that the first cavity 8 and the second cavity 32 form a parallelepipedal chamber 3. The chamber 3 is connected with a feed channel 33 (FIG. 6) filled with a liquid having the same refractive index as the waveguides 2a, 2b and extending on either side of the chamber 3 throughout the thickness of the bonding layer 31. The first cavity 8 and second cavity 32 have a square base the side of which has a width W of, for instance, between 10 and 20 micron.

The resistor 11 extends for a length W1 (FIG. 5) greater than the side W (FIG. 6) of the second cavity 32 (and hence of the chamber 3), but has a width practically equal to the width W (FIG. 6), in such a way that the heat spot substantially corresponds to the chamber 3 alone. The latter is moreover sized in such a way as to be traversed only by the central part of the light beam, flowing in the core of the fiber, and in such a way as to attenuate the tails of the Gaussian distribution representing the spatial distribution of the light beam within the waveguides 2a, 2b.

In practice, the switching control chip 5 is bonded directly to the optical switching chip 4 by means of the bonding layer 31 forming the second cavity 32, and there is no gap therebetween over the entire bonding surface, except at the channels 33, as may be seen in FIG. 6.

The optical switching device is manufactured as described in what follows.

Figure 7:
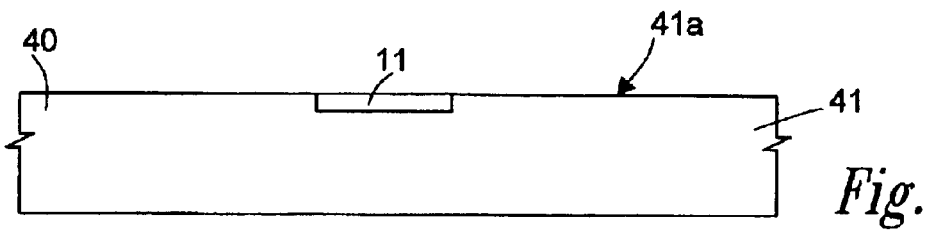
FIGS. 7 to 10 are cross-sectional views of the switching device according to an exemplary embodiment of the invention, in successive steps of the manufacturing process.

Initially, the planar lightwave circuit, the circuitry, the resistors, and the channels for feeding the liquid contained in the chambers 3 are formed separately in a known way. In particular, a plurality of lightwave circuits is formed in a first wafer comprising a silicon substrate and an optical substrate, the latter being made of glass; instead, the control circuits, the resistors 11 and the feed channels are formed in a second silicon wafer. FIG. 7 shows a second wafer 40 in this stage. The second wafer 40 is formed by a substrate 41 housing a resistor 11 and having a surface 41a.

Figure 8:
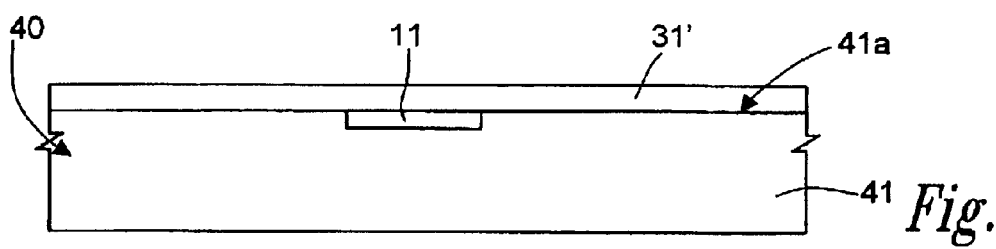

Next, on top of the surface 41a, a bonding layer 31' is deposited (FIG. 8). For example, the bonding layer 31' is made of glass which does not necessarily possess optical characteristics; for instance, boron phosphorous silicon glass (BPSG) can be used, and the bonding layer 31' may be deposited using a spin-on technique.

Subsequently, the bonding layer 31' undergoes a polishing and planarization step. At the end of this step, the bonding layer 31 has a thickness of a few micron, for instance 1–2 μm.

Figure 9:
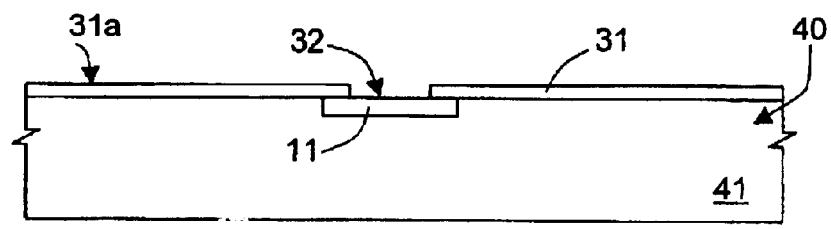

Via a masking step and subsequent etching, the bonding layer 31 is opened only above the resistors and where the channels 33 are to be formed. After removal of the mask, the structure of FIG. 9 is obtained, in which the bonding layer 31 has a through opening forming the second cavity 32. The second cavity 32 extends on top of the resistor 11 but has smaller dimensions than those of the resistor 11, as explained previously.

Figure 10:
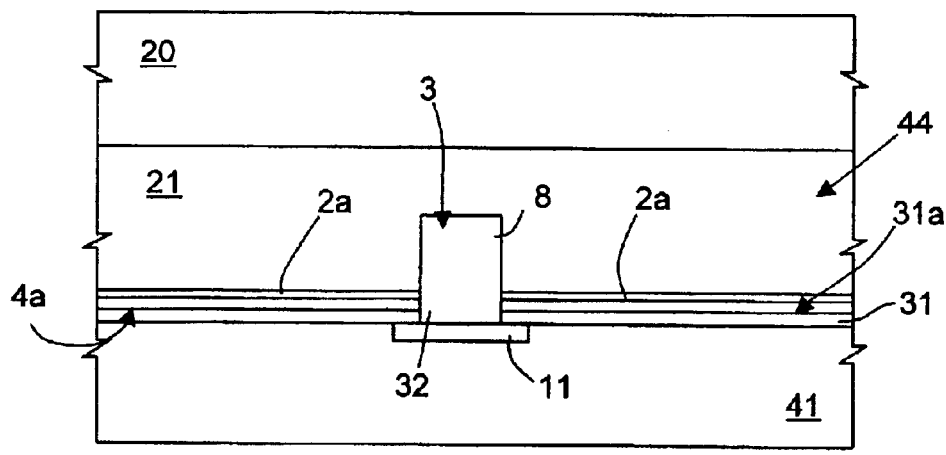

Next, the second wafer 40 is bonded to the first wafer, designated by 44 in FIG. 10, after the latter has been opened to form the first cavities and planarized, and the two wafers have been precision aligned. Bonding may be done using a glass-on-glass bonding technique, for example by means of anodic bonding.

Finally, the composite wafer formed by the first wafer 44 and the second wafer 40 is cut in such a way as to obtain a plurality of optical devices 30, as shown in FIG. 5. The reservoir chips 6 are then bonded, and optical fibers are fixed to the ends of the waveguides 2a, 2b.

Bonding of the chips 4 and 5 ensures physical and optical continuity between the bottom surface 4a of the optical switching chip 4 and the bonding layer 31. In particular, if the refractive index of the bonding layer 31 is smaller than the refractive index of the glass forming the optical layer 21 in the proximity of the surface 4a, the bonding layer 31 acts as an optical barrier for the tails of the optical beam, and thus prevents any further propagation losses.

The elimination of the gap between the chips 4 and 5 makes it possible to maintain the bubble entirely inside the cavity 8 (thus enabling a condition of stability of the bubble) and to reduce at the same time the width W of the cavity 8; consequently, a reduction is achieved of optical losses at each point of intersection of the waveguides.

The optical switching device thus obtained affords improved reliability in so far as the bonding area between the chips 4 and 5 is distributed over the entire surfaces 4a and 31a, facing one another, respectively of the chips 4 and 5, and is not limited to the area of an O-ring, as in the case of the known switching device. Furthermore, reliability is improved by the fact that bonding is between homogeneous materials.

The elimination of the steps of deposition of metallic and bonding material for forming and bonding the O-ring 9, and the replacement of the said steps with simpler and more economical operations, such as the deposition and planarization of a glass layer, enable a reduction in the manufacture costs of the device.

Bonding of the chips 4, 5 by means of layers that are homogeneous with respect to one another (optical layer 21 and bonding layer 31) makes it possible to obtain a stack of contiguous layers comprising a central glass portion (formed by the optical layer 21 and the bonding layer 31) surrounded, in sandwich fashion, by two silicon regions. In this way, bowing of the optical switching device is reduced, and hence also possible misalignments during fixing of the input/output optical fibers.

The fact that the liquid that fills the cavity 8 is in contact with the resistor 11 alone and does not fill any gap (such as the gap 10 in the case of the known optical device) reduces the risk of contamination due to particles.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Finally, it is clear that numerous modifications and variations may be made to the optical device described and illustrated herein, all falling within the scope of the inventive idea, as defined in the attached claims. In particular, as mentioned, the layer that seals laterally the chamber 3 may be a special layer, and not a bonding layer, provided it is made of a rigid material, i.e., a material not deformable at the operating temperatures of the optical device (even when the resistor 11 is traversed by current). For example, deposited metal alloys may be used having appropriate geometry, for instance forming a ring that surrounds the chamber 3; in addition, instead of BPSG a layer of silicon nitride or polysilicon, or of another equivalent material, may be used.

What is claimed is:

1. An optical device comprising:
    a first chip including an optical layer of dielectric material housing an optical circuit;
    a second chip including a body of semiconductor material housing integrated electronic components and bonded to said first chip; and
    said first chip and said second chip respectively having a first cavity and a second cavity facing one another and forming a chamber filled with a liquid, said second chip including a lateral delimiting region, made of rigid material, arranged between said body of semiconductor material and said first chip and delimiting laterally said chamber.

2. The optical device of claim 1 wherein said optical layer and said lateral delimiting region are bonded together.

3. The optical device of claim 1 wherein said optical layer and said lateral delimiting region are homogeneous with respect to each other.

4. The optical device of claim 1 wherein the liquid is contained by the chamber.

5. The device according to claim 1, wherein said lateral delimiting region is formed by an intermediate layer defining said second cavity.

6. The device according to claim 5, wherein said intermediate layer is made of a material chosen from among glass, BPSG, silicon nitride, polycrystalline silicon and a metal alloy.

7. The device according to claim 5 wherein said lateral delimiting region is formed by a bonding layer; said optical layer has a surface facing said second chip and houses waveguides intersecting one another at an intersection point; and said first cavity extends at said intersection point.

8. The device according to claim 7 wherein said body of semiconductor material houses a resistive element facing said second cavity.

9. The device according to claim 8 wherein said resistive element has, at least in one direction, a length greater than the width of said second cavity.

10. The device according to claim 8 wherein said second cavity extends throughout the thickness of said bonding layer, and said resistive element has both of its ends coated with said bonding layer.

11. A process for manufacturing an optical device, comprising:

making a first wafer having an optical layer of dielectric material housing an optical circuit;

forming a first cavity in said first wafer;

making a second wafer having a body of semiconductor material housing integrated electronic components;

forming a second cavity in said second wafer;

bonding together said first chip and said second chip so as to bring said first cavity and said second cavity into a position where they are facing one another and in which, together, they define a chamber; and forming a lateral delimiting region, made of rigid material, arranged between said body of semiconductor material and said first chip and delimiting laterally said chamber.

12. The process according to claim 11, wherein said step of forming a lateral delimiting region comprises forming an intermediate layer and forming said second cavity in said intermediate layer.

13. The process according to claim 12 wherein, prior to said bonding step, a step of forming resistive elements in said body of semiconductor material is performed, said cavities being formed on top of said resistive elements.

14. The process according to claim 12 wherein said intermediate layer is made of a material chosen from among glass, BPSG, silicon nitride, polycrystalline silicon and a metal alloy.

15. The process according to claim 14, wherein said step of forming an intermediate layer comprises forming a bonding layer and bonding directly said bonding layer to said optical layer of said first chip.

16. The process according to claim 15, wherein said bonding step comprises an anodic bonding step.

17. The process according to claim 15 wherein said step of forming a bonding layer comprises depositing said bonding layer and planarizing said bonding layer.

18. The process according to claim 15 wherein said step of depositing said bonding layer comprises depositing by means of a spinning-on technique.

19. An optical device comprising:

a planar lightwave circuit including an optical layer having a bottom surface; and a control including a substrate housing a resistor and including a rigid layer deposited on the substrate, the planar lightwave circuit and the control bonded together between the bottom surface and the rigid layer, respectively, and so shaped to form a chamber to contain a liquid.

20. The optical device of claim 19 wherein the optical layer and the rigid layer are homogeneous with respect to each other.

21. The optical device of claim 19 wherein the rigid layer is a bonding layer.

22. The optical device of claim 19 wherein the rigid layer is ringular to surround the chamber.

23. A system comprising:

means for making a first wafer having an optical layer of dielectric material housing an optical circuit;

means for forming a first cavity in said first wafer;

means for making a second wafer having a body of semiconductor material housing integrated electronic components;

means for forming a second cavity in said second wafer;

means for bonding together said first chip and said second chip so as to bring said first cavity and said second cavity into a position where they are facing one another and in which, together, they define a chamber; and means for forming a lateral delimiting region, made of rigid material, arranged between said body of semiconductor material and said first chip and delimiting laterally said chamber.

* * * * *

UNITED STATES PATENT AND TRADEMARK OFFICE
CERTIFICATE OF CORRECTION

PATENT NO.    : 6,804,424 B2
DATED         : October 12, 2004
INVENTOR(S)   : Guido Chiaretti It is certified that error appears in the above-identified patent and that said Letters Patent is hereby corrected as shown below:

<u>Title page,</u>
Insert Item -- [30]  Foreign Application Priority Data
                June 14, 2001 (EP) ............ 01830394.1 --.

Signed and Sealed this

Nineteenth Day of July, 2005

JON W. DUDAS
*Director of the United States Patent and Trademark Office*